(12) United States Patent
Reininger

(10) Patent No.: US 6,919,719 B2
(45) Date of Patent: Jul. 19, 2005

(54) METHOD AND APPARATUS FOR DETECTING THE POSITION OF A BODY

(75) Inventor: Thomas Reininger, Wernau (DE)

(73) Assignee: Festo AG & Co., Esslingen (DE)

( * ) Notice: Subject to any disclaimer, the term of this patent is extended or adjusted under 35 U.S.C. 154(b) by 7 days.

(21) Appl. No.: 10/203,261

(22) PCT Filed: Jan. 31, 2001

(86) PCT No.: PCT/EP01/00990

§ 371 (c)(1),
(2), (4) Date: Aug. 7, 2002

(87) PCT Pub. No.: WO01/69181

PCT Pub. Date: Sep. 20, 2001

(65) Prior Publication Data

US 2003/0030431 A1 Feb. 13, 2003

(30) Foreign Application Priority Data

Mar. 17, 2000 (DE) .......................... 100 13 196

(51) Int. Cl.[7] .............................................. G01B 7/14
(52) U.S. Cl. .............................. 324/207.2; 324/207.12; 324/207.24
(58) Field of Search ......................... 324/207.12, 207.2, 324/207.24, 207.25; 338/32 H, 32 R

(56) References Cited

U.S. PATENT DOCUMENTS

| | | | |
|---|---|---|---|
| 4,471,304 A | | 9/1984 | Wolf |
| 4,833,406 A | | 5/1989 | Foster |
| 4,857,842 A | * | 8/1989 | Sturman et al. ............. 324/225 |
| 4,990,841 A | * | 2/1991 | Elder .......................... 318/587 |
| 5,153,513 A | * | 10/1992 | Adachi ................... 324/207.25 |
| 5,241,267 A | | 8/1993 | Gleixner et al. |
| 5,867,021 A | * | 2/1999 | Hancock ................... 324/207.2 |

FOREIGN PATENT DOCUMENTS

| | | |
|---|---|---|
| DE | 3643290 C2 | 7/1989 |
| DE | 4343198 C2 | 6/1996 |
| DE | 19504229 A1 | 8/1996 |
| DE | 19513829 A1 | 10/1996 |
| DE | 19652988 A1 | 6/1998 |
| DE | 19647897 C2 | 10/1998 |
| DE | 19806099 A1 | 11/1998 |
| DE | 19751519 A1 | 5/1999 |
| EP | 0893668 A1 | 1/1999 |
| GB | 2107070 A | 4/1983 |
| JP | 07190704 | 7/1995 |

OTHER PUBLICATIONS

Translation of the International Preliminary Examination Report for International Application No. PCT/EP01/00990.

* cited by examiner

*Primary Examiner*—Jay Patidar
(74) *Attorney, Agent, or Firm*—Hoffmann & Baron, LLP

(57) ABSTRACT

A position detecting means comprising a sensor arrangement (14) for producing at least one sensor signal in a fashion dependent on a body (11) moving past said means, the sensor signal or signals continuously changing on such movement past. The at least one sensor signal is compared with at least one reference value in a comparator arrangement (20), control means being provided for electronic setting of the sensor arrangement (14) by changing the reference value and the output signal of the comparator arrangement (20) forms the position signal (P) for detection of a relative position of the body (11) and the sensor arrangement (14). Accordingly it is possible for the arrangement (14) to be mechanically set in a relatively rough manner and fine adjustment may be performed by changing the reference value electronically.

35 Claims, 4 Drawing Sheets

METHOD AND APPARATUS FOR DETECTING THE POSITION OF A BODY

CROSS-REFERENCE TO RELATED APPLICATION

This application is a National Phase Application of International Application No. PCT/EP01/00990 filed Jan. 31, 2001, which claims priority based on German Application No. 100 13 196.4 filed on Mar. 17, 2000, which are incorporated herein by reference.

BACKGROUND OF THE INVENTION

1. Field of the Invention

The invention relates to a position detecting means comprising a sensor arrangement for producing at least one sensor signal in a manner dependent on a body moving past the means.

2. Description of Related Art

Conventional position detecting means, see for example German patent publication 19,504,229 A1 and more particularly those designed for detecting a piston in a cylinder, serve to produce a position signal at one or more given piston positions by means of which the display means and/or the control routines are able to be operated and, respectively, implemented. For this purpose the piston is provided with a permanent magnet and as a sensor a magnetic field sensor, more particularly a hall effect sensor, is employed. On moving past the permanent magnet a sine signal is produced in the hall effect, which in a comparator is compared with a predetermined, set reference value. If this reference value is reached or, respectively, exceeded, a position signal is generated. The sensor arrangement is normally arranged to be slid in the longitudinal direction and may be set at any desired positions. Since the position signal must be detected in an extremely accurate manner, it is necessary to provide for complex and accurate adjustment of the sensor arrangement.

One object of the present invention is to produce an exact position signal without complex mechanical setting operations.

This object is attained in accordance with the invention by a position detecting means.

The advantage of the position detecting means of the invention is more particularly that the sensor arrangement only needs to be approximately fitted adjacent to the position to be detected, whereas exact setting may be performed purely electrically by changing the reference value. This is even possible by remote control. This adjustment may be implemented in a simple fashion by moving the movable body, for example a piston, into the desired position in which a position signal is to be produced, the reference value then being changed until the position signal is produced.

A preferred embodiment is such that the body produces a magnetic field or possesses a magnet for producing such a magnetic field and that the sensor arrangement comprises at least one magnetic field sensor, more particularly in the form of a hall effect sensor. In principle the invention is however applicable to other principles of measurement, for example to optical, to infrared or to electromagnetic measurement methods.

In accordance with a preferred development the sensor arrangement comprises two sensors, of which preferably the one produces a sine signal and the other produces a cosine signal proportional to the relative position of the body and the sensor arrangement, a signal processing circuit being provided for conversion of such signals into a signal substantially linearly dependent on the relative position. Such a sine signal and a cosine signal may for example be produced by two magnetic field sensors, which are arranged at an angle of 45 degrees to one another. By combination of the sine signal and the cosine signal it is possible to produce a substantially linearly rising or, respectively, decaying signal, it not being the absolute amplitude but the phase relationship which is relevant for conversion. Accordingly there is an independence from variations in the strength of the magnetic field owing to inaccuracy of magnetic components and lack of homogeneity of the magnet and furthermore temperature dependency of the magnet.

As magnetic field sensors two hall effect sensor bridge circuits are suitable, which are commercially available as self-contained complete components.

The comparator arrangement preferably possesses a window comparator or schmitt-trigger. Therefore it is possible for the start and end of a signal of the position signal to be adjusted. As control means for changing the reference value it is more particularly suitable to employ an electrically adjustable potentiometer or a signal storage means for the reference value, more particularly in the form of a digital counter or a digital memory. The same may either be arranged adjacent to the sensor arrangement and constitute a structural unit with it or however they may be arranged separate from it in space, the adjustment of the control means and/or the setting of the reference value then taking place by remote control by way of an electrical line, more particularly a bus, or in some wireless manner. For the adjustment of the control means or, respectively, for setting the reference value it is possible to provide at least one manual operating element.

The evaluating circuit comprising at least the comparator arrangement may constitute a component group together with the sensor arrangement or it is possible for such evaluating circuit to be separate in space and more particularly be integrated in a program controlled control unit. If an analog comparator arrangement is provided, it is then possible for the digital signal from such a program controlled control unit to be converted by means of a digital/analog converter into an analog signal.

BRIEF DESCRIPTION OF THE SEVERAL VIEWS OF THE DRAWINGS

FIGS. 1–4 diagrammatically indicate a piston and cylinder unit with a sensor arrangement and the evaluating circuit connected with it as a working example of the invention.

DETAILED DESCRIPTION OF THE PREFERRED EMBODIMENTS

In a cylinder 10 a piston 11 having a piston rod 12 is arranged for longitudinal motion. In the piston 11 a permanent magnet 13 is arranged.

Figure 3:
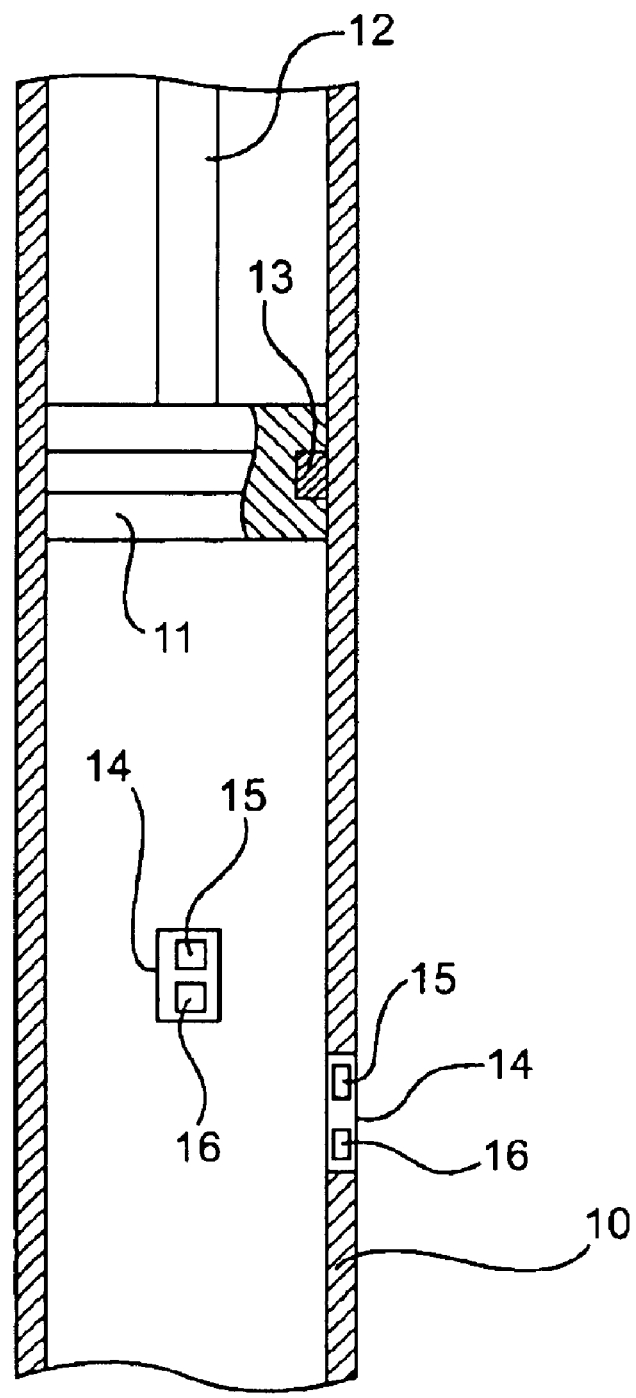
FIG. 3 shows a third embodiment of the invention, in which a sensor arrangement is mounted on a wall of a cylinder.

A diagrammatically represented sensor arrangement 14 is mounted on the wall of the cylinder 10, and in a manner, which is not illustrated, is designed to be moved longitudinally and able to be set in different positions. It is naturally possible to provide more such sensor arrangements for detecting several piston positions. The sensor arrangement or sensor arrangements may also be integrated in the cylinder's wall as shown in FIG. 3.

Figure 1:
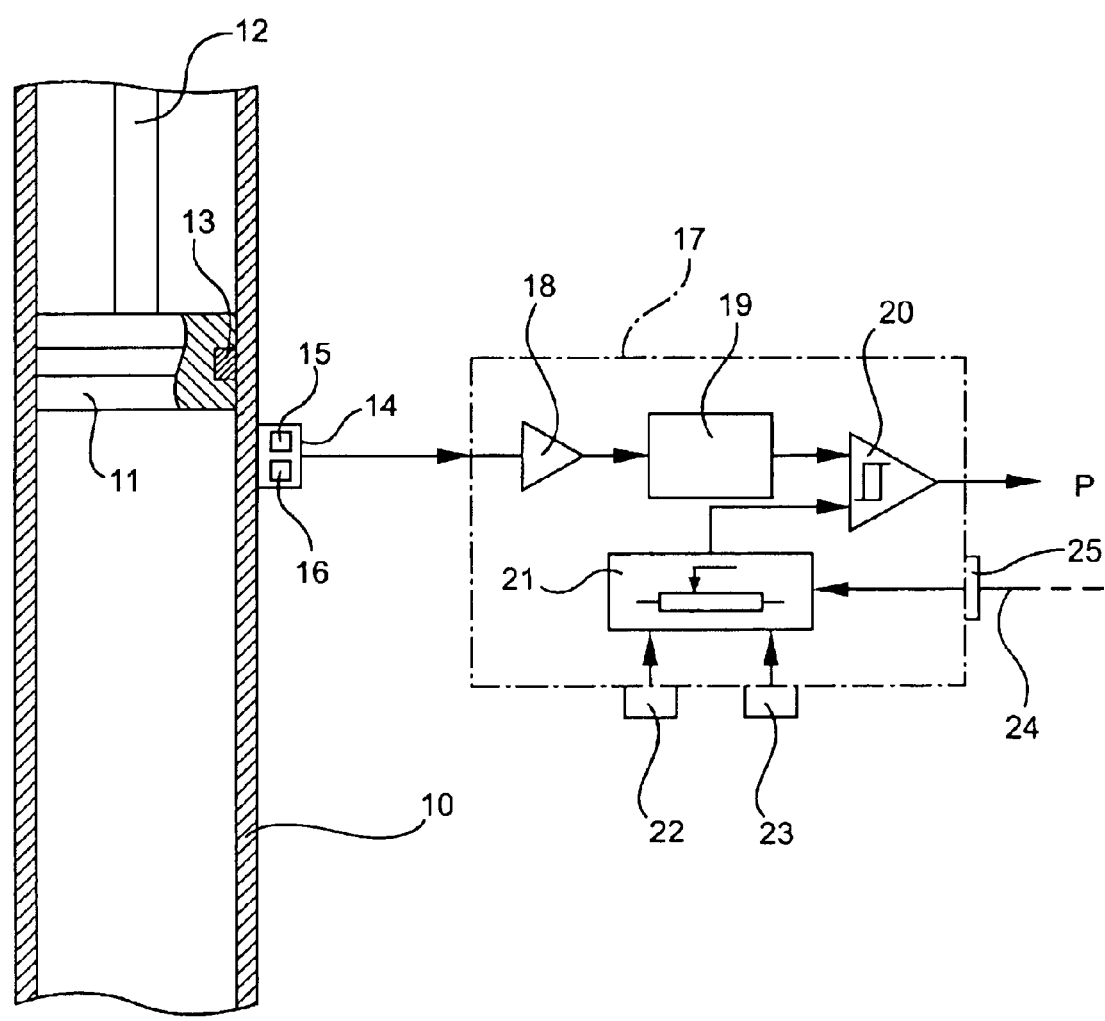
FIG. 1 shows a first embodiment of the invention.
Figure 2:
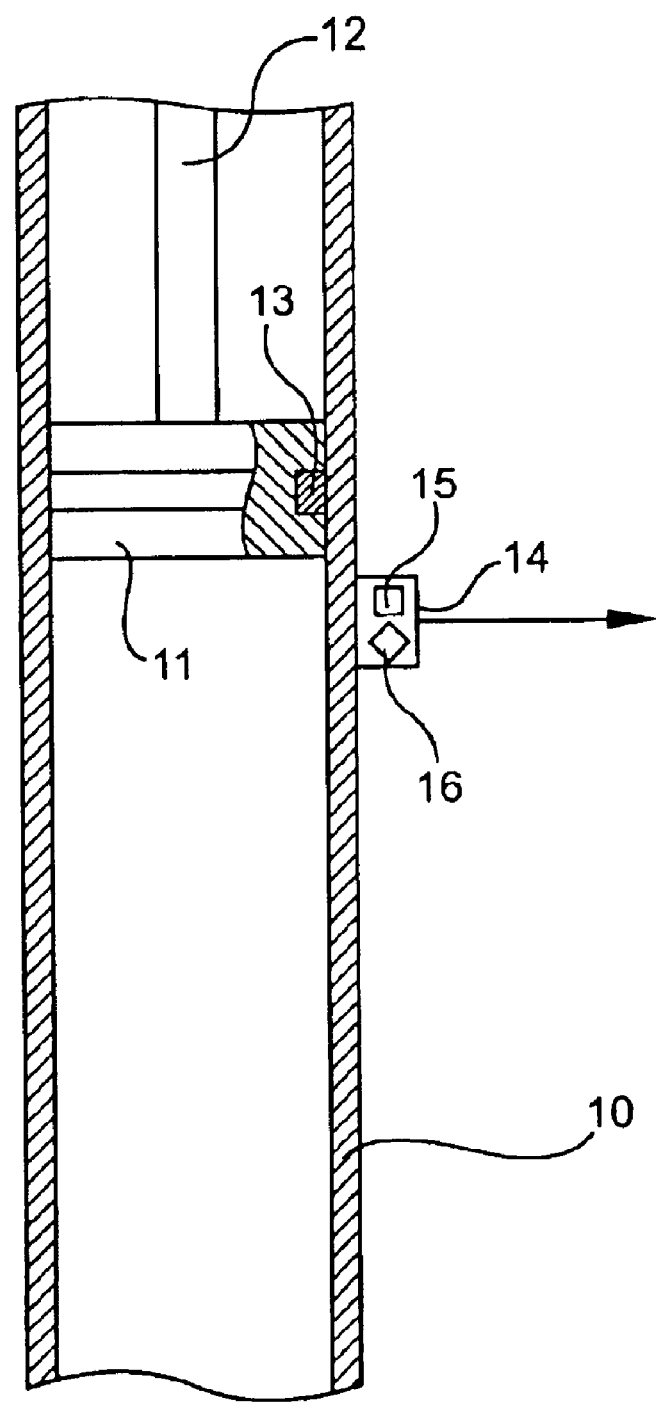
FIG. 2 shows a second embodiment of the invention, in which sensors are mounted at 45 degrees to one another.

The sensor arrangement 14 comprises two hail effect sensors 15 and 16, for which commercially available hail effect sensor bridges may be employed. The hall effect sensors 15 and 16 are so positioned, for example 1 by being set at a relative angle of 45 degrees to one another as shown in FIG. 2, that under the effect of the magnetic field of the permanent magnet 13 on moving past the same they supply two output signals with a phase shift of 90 degree phase difference between them. It is of course possible to utilize other magnetic field sensors, such as coils or the like, which also yield two phase shifted signals, that is to say a sine and a cosine signal given a suitable positioning.

If the piston 11 moves past the sensor arrangement 14, the hall effect sensors 15 and 16 will supply a sine and cosine signal proportional to the respective setting of the permanent magnets 13 in relation to the sensor arrangement 14. These signals are supplied to an evaluating circuit 17 and thence by way of an input amplifier 18 to a signal processing circuit 19. Instead of or in addition to the input amplifier 18 it is also possible to provide a signal filter.

In the signal processing circuit, the two signals are converted into a linear output signal, more particularly by the combination of the sine signal and the cosine signal. Therefore, during conversion it is not the absolute amplitude but only the phase relationship which is relevant. This linear output signal is supplied to a comparator 20 where it is compared with a variable reference value. If the signal is the same, a position signal P is produced as the output signal.

If the comparator 20 is designed in the form of a window comparator or Schmitt trigger, the time of switching on and the time of switching off can be set, an adjustable hysteresis or a variable switch on and switch off threshold being provided if desired. If needed two different reference signals may be produced.

The reference signal is produced by an electrically adjustable potentiometer 21. By way of two push-button switches 22 and 23, the reference values can be increased or reduced in size, other manual adjustment means also naturally being possible. For the adjustment, the sensor arrangement 14 is moved into the approximate position, in which the piston 11 or, respectively, its permanent magnet 13 is to produce a position signal. Now by operation of the push-button switches 22 and, respectively, 23 the reference value is increased or reduced by means of the potentiometer as necessary until the comparator responds. The reference value is thus set. If necessary, a second or further reference values may be produced in a corresponding or similar fashion.

Instead of or in addition to the push-button switches 22 and 23 the potentiometer 21 may also be set by way of an external line 24, which is connected with a connection terminal 25 of the evaluating circuit 17. With the aid of such an external signal, which for example is produced by an external control unit, which may be a program controlled control unit, it is possible to adjust or set the potentiometer 21 or, respectively, the entire position detecting means by remote control.

Instead of an adjustable potential 21 it is also possible to have a signal memory means, as for instance a digital counter or some other digital memory. The count, which sets the reference value, may also be set in advance by means of the push button switches 22 and 23 and/or by way of the line 24. This will also apply for any other digital memory, whose stored value may also be set by way of the line 24. In the case of a counter or other digital memory, a digital/analog converter is naturally necessary as well to be able to supply an analog reference value to the comparator 20. On the other hand, the comparator 20 may be designed in the form of a digital comparator, it then being necessary for a corresponding digital sensor signal to be formed in the signal processing circuit 19.

The evaluating circuit 17 may be contained in a compact subassembly, together with the sensor arrangement 14, able to be mounted on the cylinder 10. On the other hand it may also be arranged in an integral manner as an external subassembly or separately. In this case the above mentioned subassemblies of the evaluating circuit 17 may for the most part be effected by microprocessor functions. The change in the reference value may then be performed using conventional operating functions of the computer.

In accordance with a further alternative design instead of the adjustable potentiometer 21 or a signal memory means, the reference value for the comparator 20 is entered directly in the evaluating circuit 17 by way of the line 24 using an external control means or, respectively, an external computer. In the case of the line 24 it may be a question of a bus line, any necessary bus stations then having to be provided.

The invention is naturally not limited to piston and cylinder units, and is in fact able to be employed in all circumstances, where any bodies are moved past sensor arrangements. Instead of detecting positions during linear movement, non-linear motion, as for example circular movement, may be detected in a corresponding manner.

In order to increase the adjustment range for the electrical or, respectively, electronic adjustment, such adjustment range may also be electrically spread.

Instead of remote control of the electrically adjustable potentiometer 21 or some other signal memory means or instead of setting the reference values directly by way of the line 24 it is possible for such operations to take place in a wireless manner, for example by radio or infrared transmission.

Figure 4:
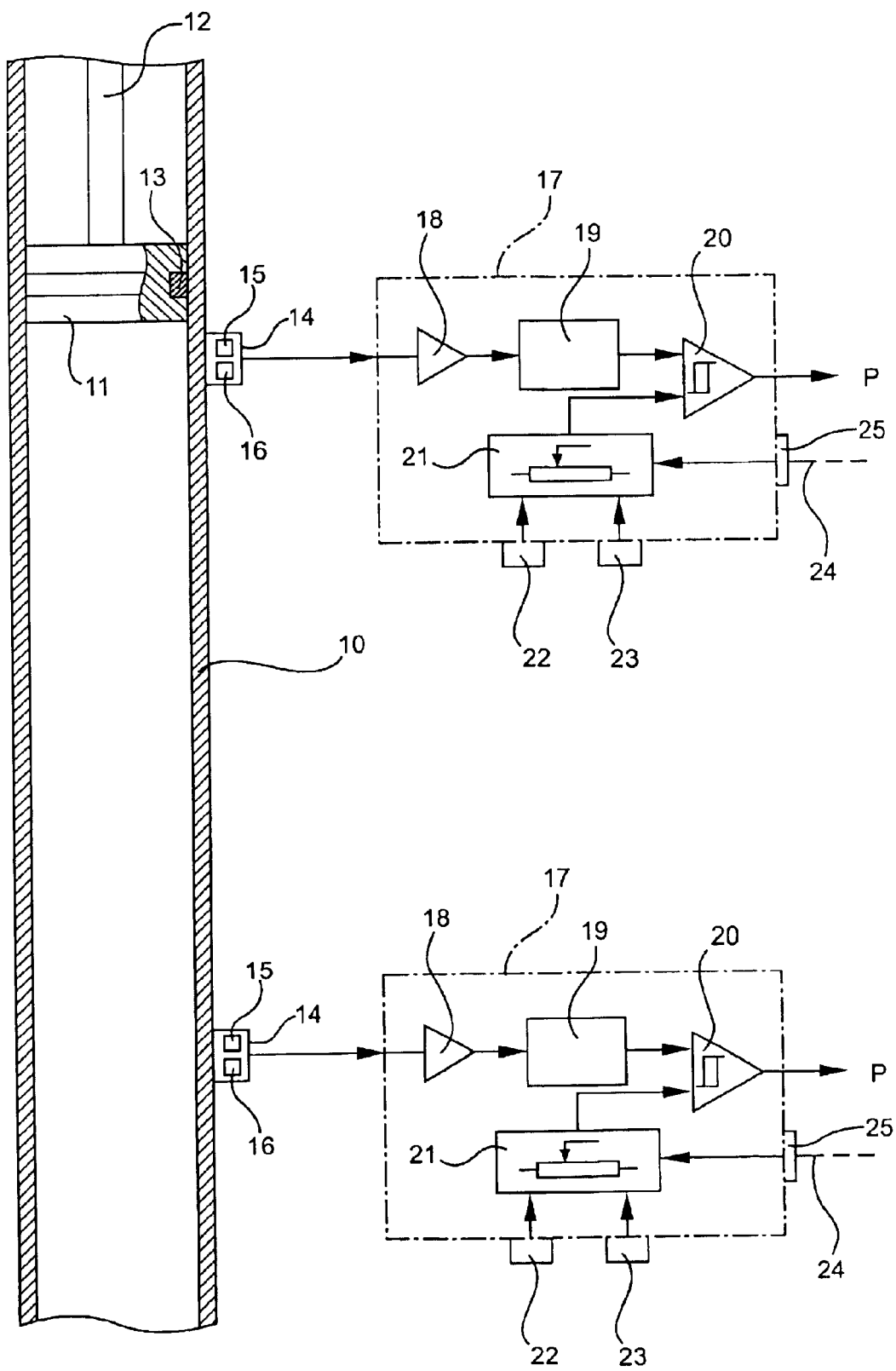
FIG. 4 shows a fourth embodiment of the invention, in which several sensors are mounted in a direction of motion; and Working examples of the invention are represented in FIGS 1–4 and will be described in the following account in detail.

In an alternative design the sensor arrangement can possess several identical sensors or sensor combinations arranged one after the other in the direction of motion as shown in FIG. 4. Such sensors then produce identical time varying signals as well, which are offset in time in accordance with the local offset of the sensors. At each position there will be a certain signal combination of such sensors, all signal combinations being able to be detected by the signal characteristics. If now a predetermined position is to be detected, the signals stored for this position will be preset and applied to one or more corresponding comparators as reference values so that the desired position may be extremely exactly detected and errors may be detected at once. It is naturally possible for dimensional inaccuracies to be preset. For the electronic setting of position detection suitable different combinations of the reference values will be employed.

What is claimed is:

1. A position detecting means comprising a sensor arrangement for producing at least one sensor signal in a manner dependent on a body moving past the means, the at least one sensor signal changing on such movement past the means, a comparator arrangement comparing the at least one sensor signal with at least one reference value, control means being provided for electronic adjustment of the sensor arrangement by changing the reference value and the output signal of the comparator arrangement forming a position signal (P) for detection of a relative position of the body and the sensor arrangement, wherein the sensor arrangement comprises at least two sensors, whose signals are converted in a signal processing circuit into a signal dependent in a substantially linear fashion on the relative position of the body and the sensor arrangement, and wherein one sensor signal is a sine signal and the other signal is a cosine signal.

2. The position detecting means as set forth in claim 1, wherein the body produces a magnetic field or comprises a magnet for the production of such a magnetic field and that the sensor arrangement comprises at least one magnetic field sensor.

3. The position detection means as set forth in claim 2, wherein the at least one magnetic field sensor includes a Hall effect sensor.

4. The position detecting means as set forth in claim 1, wherein two magnetic field sensors are arranged at an angle of 45 degrees in relation to one another.

5. The position detecting means as set forth in claims 4, wherein as magnetic field sensors two hail effect sensor bridge circuits are provided.

6. The position detecting means as set forth in claim 1, wherein the comparator arrangement comprises at least one window comparator or schmitt trigger, the reference value being variable.

7. The position detecting means as set forth in claim 1, wherein the sensor arrangement comprises several identical sensors or sensor combinations arranged one after the other in the direction of motion, whose signals are compared by at least one corresponding component of the comparator arrangement with reference values, which correspond to the sensor signals at the relative position to be detected.

8. The position detecting means as set forth in claim 1, wherein the control means comprises an electrically settable potentiometer or a signal memory means for the reference value.

9. The position detection means as set forth in claim 8, wherein the control means comprises at least one of a digital counter and a digital memory.

10. The position detecting means as set forth in claim 1, wherein for electronically adjusting the sensor arrangement at least one manual operating element is provided.

11. The position detecting means as set forth in claim 1, wherein the electronic adjustment of the sensor arrangement and/or the setting of the reference value is remotely controlled in at least one of a wired and a wireless fashion.

12. The position detecting means as set forth in claim 1, further comprising an evaluating circuit comprising at least one comparator means which constitutes a subassembly together with the sensor arrangement.

13. The position detecting means as set forth in claim 1, further comprising an evaluating circuit comprising at least one of the comparator arrangement, and the control means integrated in a manner separated in space from the sensor arrangement.

14. The position detection means as set forth in claim 13, wherein the evaluating circuit is in a programmable control unit.

15. The position detecting means as set forth in claim 1, wherein the body is the piston of a piston and cylinder unit and the sensor arrangement is integrated on the cylinder.

16. The position detection means as set forth in claim 15, wherein the sensor arrangement is integrated on the cylinder in a longitudinally sliding manner.

17. The position detection means as set forth in claim 15, wherein the sensor arrangement is in the cylinder.

18. The position detection means as set forth in claim 1, wherein the at least one senor signal changes continuously in response to the body moving past the position detecting means.

19. A position detector, the position detector comprising:
a sensor assembly, the sensor assembly outputting at least one sensor signal in response to a body moving past the sensor, the at least one sensor signal changing in response to the body moving past the sensor, wherein the sensor assembly comprises at least two sensors, the at least two sensors outputting output signals that are converted in a signal processing circuit into a composite signal, the composite signal being dependent in a substantially linear fashion on the relative position of the body with respect to the sensor assembly, and wherein the at least two sensors comprise magnetic field sensors substantially arranged at an angle of 45 degrees with respect to each other;
a comparator, the comparator comparing the at least one sensor signal to at least one reference value, the comparator outputting an output signal representing the comparison; and
a controller, the controller being adapted for electronically adjusting the sensor assembly by changing the at least one reference value, the output signal of the comparator representing a position of the body with respect to the sensor assembly.

20. The position detector as defined in claim 19, wherein the body comprises at least one of a magnetic field and a magnet, the sensor assembly comprising at least one magnetic field sensor.

21. The position detector as defined in claim 20, wherein the at least one magnetic field sensor comprises a Hall effect sensor.

22. The position detector as defined in claim 19, wherein the output signals output from the at least two sensors comprise a sine signal and a cosine signal.

23. The position detector as defined in claim 19 wherein the at least two sensors comprise at least two Hall effect sensor bridge circuits.

24. The position detector as defined in claim 19, wherein the comparator comprises at least one of a window comparator and a Schmitt trigger, the at least one reference value being variable.

25. The position detector as defined in claim 19, wherein the sensor assembly comprises a plurality of substantially similar sensors disposed along a direction of motion, the plurality of substantially similar sensors outputting signals that are compared by at least one corresponding component of the comparator with at least one reference value.

26. The position detector as defined in claim 19, wherein the controller comprises at least one of a potentiometer, a signal memory, a digital counter, and a digital memory that is adapted to store the at least one reference value.

27. The position detector as defined in claim 19, further comprising at least one manual operating element adapted to adjust the controller.

28. The position detector as defined in claim 19, wherein at least one of the controller and the at least one reference value is adapted to be remotely controlled in at least one of a wired and wireless fashion.

29. The position detector as defined in claim 19, further comprising a subassembly, the subassembly comprising an evaluating circuit and the sensor assembly, the evaluating circuit comprising at least one comparator.

30. The position detector as defined in claim 19, further comprising an evaluating circuit, the evaluating circuit comprising at least one of the comparator and the control means, the evaluating circuit being integrated in a manner separate from the sensor assembly.

31. The position detector as defined in claim 19, wherein the body comprises a piston in a cylinder, the sensor assembly being integrated on the cylinder.

32. The position detector as defined in claim 31, wherein the sensor assembly is integrated on the cylinder in a longitudinally sliding manner.

33. The position detector as defined in claim 31, wherein the sensor assembly is integrated in the cylinder.

34. A position detecting means comprising a sensor arrangement for producing at least one sensor signal in a manner dependent on a body moving past the means, the at least one sensor signal changing on such movement past the means, a comparator arrangement comparing the at least one sensor signal with at least one reference value, control means being provided for electronic adjustment of the sensor arrangement by changing the reference value and the output signal of the comparator arrangement forming a position signal (P) for detection of a relative position of the body and the sensor arrangement, wherein the sensor arrangement comprises at least two sensors, whose signals are converted in a signal processing circuit into a signal dependent in a substantially linear fashion on the relative position of the body and the sensor arrangement, wherein one sensor signal is a sine signal and the other signal is a cosine signal, and wherein two magnetic field sensors are arranged at an angle of 45 degrees in relation to one another.

35. A position detector, the position detector comprising:

a sensor assembly, the sensor assembly outputting at least one sensor signal in response to a body moving past the sensor, the at least one sensor signal changing in response to the body moving past the sensor wherein the sensor assembly comprises at least two sensors, the at least two sensors outputting output signals that are converted in a signal processing circuit into a composite signal, the composite signal being dependent in a substantially linear fashion on the relative position of the body with respect to the sensor assembly, wherein the at least two sensors comprise magnetic field sensors substantially arranged at an angle of 45 degrees with respect to each other, and wherein the output signals output from the at least two sensors comprise a sine signal and a cosine signal;

a comparator, the comparator comparing the at least one sensor signal to at least one reference value, the comparator outputting an output signal representing the comparison; and a controller, the controller being adapted for electronically adjusting the sensor assembly by changing the at least one reference value, the output signal of the comparator representing a position of the body with respect to the sensor assembly.

* * * * *

UNITED STATES PATENT AND TRADEMARK OFFICE
CERTIFICATE OF CORRECTION

PATENT NO. : 6,919,719 B2  
DATED : July 19, 2005  
INVENTOR(S) : Thomas Reininger It is certified that error appears in the above-identified patent and that said Letters Patent is hereby corrected as shown below:

Column 3,  
Line 9, "two hail effect" should read -- two hall effect --;  
Line 10, "available hail" should read -- available hall --;  
Line 12, "for example 1 by" should read -- for example, by --.

Signed and Sealed this

Twenty-first Day of February, 2006

JON W. DUDAS  
*Director of the United States Patent and Trademark Office*